United States Patent Office 3,219,604
Patented Nov. 23, 1965

3,219,604
POLYESTER RESIN COMPOSITION MODIFIED BY MONOCARBOXYLIC ACID AND METALLIC BRIDGING AGENT
William K. Fischer, Woodbury, Conn., assignor to United States Rubber Company, New York, N.Y., a corporation of New Jersey
No Drawing. Filed July 25, 1961, Ser. No. 126,517
19 Claims. (Cl. 260—22)

This invention relates to polyester resin compositions, and more particularly it relates to compositions containing polyesters modified by monocarboxylic acids and metallic bridging agents.

The polyester resin compositions to which the invention applies are thermosetting mixtures of unsaturated polyester resins with copolymerizable ethylenicaly unsaturated monomers. Resin compositions of this kind are well-known (see, for example, U.S. Patent 2,255,313, Ellis, September 9, 1941, and 2,667,430, Wells, January 26, 1954), and are much used as laminating, molding and casting compositions. Under the influence of various catalytic or promoting substances, these resinous compositions, which are initially liquid or dough-like materials, can be converted into solid, insoluble and infusible shapes. One object of the invention is to provide a curable composition of this kind, having a higher viscosity in the uncured condition, at a given content of copolymerizable ethylenically unsaturated monomer. Another object of the invention is to permit the use of a higher content of copolymerizable ethylenically unsaturated monomer at a selected viscosity level. Yet another object is to provide a cured composition of this kind characterized by improved flexibility and impact resistance. It is still another object of the invention to provide a composition which does not cure unduly violently, and therefore has reduced tendency to develop strains which later lead to crazing. It is yet another object of the invention to provide a more economical polyester resin composition of the kind described, of good quality. Still another object is to provide a polyester resin composition which has a reduced tendency to penetrate into absorbent materials such as tightly woven fabrics, paper, etc. and is therefore advantageous in coating paper or producing a waterproof surface on such products as automotive windlacing.

In one aspect the invention involves a novel method of plasticization of the polyester resin composition.

In practicing the invention, a polyester having an acid number of from 10 to 100 is first prepared, and such polyester is then reacted with an aliphatic monocarboxylic acid through the agency of a metal linkage, such as a magnesium, aluminum, or calcium linkage.

The aliphatic monocarboxylic acid employed in the invention for modifying the polyester resin through a metal linkage usually has at least 6 carbon atoms in the chain, and is frequently a saturated fatty acid having from 6 to 24 or more carbon atoms in the chain, such as caproic (hexanoic), caprylic (octanoic), capric ($C_{10}$), lauric ($C_{12}$), myristic ($C_{14}$), palmitic ($C_{16}$), stearic ($C_{18}$), arachidic ($C_{20}$), or behenic (docosanoic, $C_{22}$) acid, and the acid may be either straight chain or branched chain. Unsaturated acids may be used, such as 9-dodecenoic, 9-tetradecenoic, 9-hexadecenoic, 9-octadecenoic, 9-eicosenoic, and 13-docosenoic acid. Less preferred are the acids having more than one double bond, such as linoleic acid and linolenic acid. Products in which mixtures of acids of the foregoing kind occur, such as tall oil acid, may be used. The acids having more than one double bond may tend to retard the curing of the composition by the free radical peroxide curing system commonly employed for polyester compositions, but in certain applications this is desirable. However, acids containing conjugated unsaturation, such as tung oil acids, have a more pronounced tendency to retard curing, and therefore if we use such acids we prefer to use them in relatively small amount, frequently in admixture with the more preferred kinds of acid.

The metal linkage between the polyester and the just-described added monocarboxylic acid may, as indicated, be a magnesium, aluminum or calcium linkage. For this purpose such metal is usually added in the form of its oxide, although the hydroxide of the metal, or equivalent organo-metallic compounds, such as the metal alkoxides (in which the alkyl group usually contains 1 to 6 carbon atoms), may be employed. Magnesium oxide is preferred, but such compounds as magnesium hydroxide, calcium hydroxide, calcium oxide, aluminum propoxide, and magnesium ethoxide, or the like, may also be used as coupling agents to effect the metal bridging between the polyester and the added monocarboxylic acid. For convenience in description, magnesium oxide will usually be referred to herein as the metallic coupling agent, but it will be understood that other metal compounds of the kind just described may be substituted for magnesium oxide.

The preparation of the polyester itself involves heating, usually at a temperature of 280 to 480° F. for a period of from 4 to 24 hours, a mixture of one or more glycols and one or more alpha, beta-ethylenically unsaturated polycarboxylic acids. Usually a dicarboxylic acid (or its corresponding anhydride) is used. For purposes of the invention, the resulting self-condensation esterification product has, as indicated, an acid number of from 10 to 100. Such a polyester is sometimes called an "alkyd" and although it is commonly referred to as "resinous," it may be either a viscous liquid or a solid in the uncured state. In conventional practice polyesters are mixed with copolymerisable ethylenically unsaturated monomers (e.g. styrene, vinyl toluene, methyl methacrylate, vinyl acetate, diallyl phthalate, triallyl cyanurate,) frequently in amount of from 5% to 80% by weight of the mixture of polyester and monomer, and then cured to a solid, insoluble, infusible, cross-linked state with the aid of conventional catalyst systems.

In accordance with the invention, the uncured polyester is modified by reacting it with a monocarboxylic acid of the kind described, and magnesium oxide or like metal coupling agent. As a result of this treatment, it is believed that the carboxyl group of the fatty acid reacts with the carboxyl group of the polyester resin or alkyd, under the influence of the magnesium oxide, with elimination of water, to form a product in which the fatty acid is linked to the alkyl through the magnesium atom:

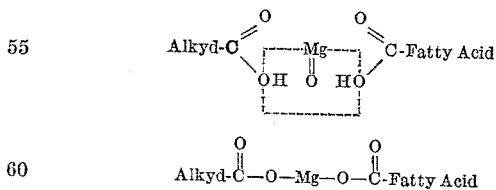

Alkyd-C(=O)-O-Mg-O-C(=O)-Fatty Acid

The resulting product as modified in accordance with the invention is characterized by a remarkably increased viscosity, in comparison to a comparable polyester-copolymerizable monomer composition containing the same percentage of copolymerizable monomer. This property is of great importance in using the resin to fabricate articles by hand lay-up techniques, or by coating or spraying, since the relatively high viscosity prevents the resin from dripping or running out of place. The modified resin of the invention is also useful in premix and preform molding with metal dies where high viscosity resin is desirable and frequently necessary. The invention therefore affords a means of increasing the viscosity of the composition without decreasing the content of copolymerizable monomer, which would not only be uneconomical, but would be reflected in undesirable physical properties in the final cured product.

In order to modify the polyester, I add to the polyester as originally prepared having an acid number of 10 to 100, from 1 to 15 parts by weight of the monocarboxylic acid per 100 parts by weight of polyester (not counting added polymerizable monomer), depending on the degree of modification desired. The amount of magnesium oxide added may be the stoichiometric amount required in theory to supply sufficient magnesium to couple the added acid to the polyester. However, it is found in practice that a desirable increase in viscosity can be obtained even with appreciably less than the theoretical stoichiometric amount, say 50% or even as little as 10% of the stoichiometric amount. While it is possible to use considerably more than the stoiciometric amount of magnesium oxide, for reasons of economy I do not ordinarily do so. Increased quantities of magnesium oxide over the stoichiometric may be used if desired, but the excess amount usually simply acts essentially as a filler. In general, it may be stated that the amount of magnesium oxide or the like used usually falls within the range of from 0.1 to 3 parts by weight, per 100 parts of the unmodified polyester itself (not counting copolymerizable monomer), depending upon such variables as the amount of added fatty acid, the acidity of the alkyd, and the degree of modification desired.

I invariably find it preferable to have at least a part of the copolymerizable monomer present during the modification reaction to prevent the mix from becoming unduly viscous. Sometimes I add a part of the copolymerizable monomer to the polyester prior to the modification reaction, and then I add the rest of the copolymerizable monomer to the mix after the modification step, to bring the total amount of copolymerizable monomer to some 5 to 80% by weight, based on the whole mixture including the monomer. If desired, all of the desired copolymerizable monomer may be present in the alkyd during the acid modification reaction. Although it is not essential for purposes of the reaction to have copolymerizable monomer present, the alkyd usually becomes so viscous that it is desirable to have at least some of the monomer present, for convenience in handling.

To bring about the desired reaction between the polyester, the modifying monocarboxylic acid, and the magnesium oxide or similar bridging agent, I heat the mixture of these materials at an elevated temperature, usually within the range of 140 to 250° F., for a period of time sufficient to bring about substantial reaction between the ingredients, frequently for a period of from 5 minutes to 40 hours (the time and temperature being in general inversely related), depending on the such variables as the particular reactants involved and the degree of modification desired.

I find that the modification reaction is facilitated by having present a dehydrating agent such as a small amount (e.g., 1 to 10 parts per 100 parts by weight of the unmodified polyester itself) of calcium chloride.

In practice, conventional inhibitors of polymerization are added to the composition either during manufacture of the polyester, or subsequent thereto, or both. Such inhibitors may be used in conventional amounts, e.g., 10 to 1000 parts per million parts by weight of the unmodified polyester itself, and any suitable conventional inhibitor may be used, such as hydroquinone, quinone, tertiary butyl catechol, or small amounts of copper. The inhibitor serves to prevent gelation during the modification process, as well as in subsequent storage and shipment.

The composition is characterized by the ability to be cured to a solid, infusible, insoluble, cross-linked state, under the influence of the polymerization catalyst and/or "promoters" usually used for this purpose, notably peroxidic materials, such as benzoyl peroxide, hydroperoxides such as tertiary butyl hydroperoxide, ketone peroxides such as methyl ethyl ketone peroxide, with or without such catalytic materials as cobalt, manganese and the like, as well as such promoters as N-methylaniline or the like (U.S. Patent 2,449,299, Hurdis, September 14, 1948), diethyl aniline or the like (Hurdis, 2,480,928, September 6, 1949), or various other conventional catalyst mixtures. The catalyst may be used in conventional amounts, usually from 0.2 to 3% by weight of the polyester-copolymerizable monomer mixture, although larger amounts such as 4 or 5% can also be used. Cobalt or the like is usually used in the form of sufficient soluble cobalt salt (e.g., cobalt acetate, octoate, oxide or hydroxide, chloride or nitrate) to supply for example from 0.001 to 0.2%, or more of cobalt ion. The promoters are frequently used in amount of from 0.001 to 1%, or up to 2% or more, by weight, based on the weight of polyester plus copolymerizable monomer. Depending upon the amount and kind of catalyst and promoting materials, the composition can be cured readily at essentially room temperature (e.g., frequently 60° F. to 80° F.), or, if desired, at elevated temperatures (of the order of, e.g., 120° to 350° F. for a period of from 5 minutes to 4 hours or more) particularly during the final stages of the cure.

The cured product of the invention is remarkable for its flexibility, in comparison to a similar composition not modified by a fatty acid as described containing a comparable amount of copolymerizable monomer. Because the plasticizer, that is, the fatty acid, is chemically combined with the polyester resin in the present product it is essentially permanent, and not susceptible of being leached out or of bleeding out, when the cured article is in use. The composition of the invention is particularly advantageous for use in making coated articles of various kinds. Coated or shaped articles made from the composition of the invention are characterized by good surface smoothness, and absence of crazing, and they are remarkable for their improved impact resistance and other good physical properties.

The composition of the invention can also be used to good advantage in air cured hand lay-up laminates as well as molded structures.

It will be understood that in the original preparation of the polyester itself, any glycols and unsaturated polycarboxylic acids conventionally used for making polyesters may be employed. By way of non-limiting example, it may be mentioned that polyesters can be prepared from such acids as maleic, fumaric, aconitic, mesaconic, citraconic, ethylmaleic, pyrocinchoninic, veronic, or itaconic acid (with or without other acids) and such glycols as ethylene, diethylene, triethylene, polyethylene, 1,3-propylene, 1,2-propylene, dipropylene (1,3 or 1,2), butylene or styrene glycol.

The copolymerizable ethylenically unsaturated monomers suitable for mixing with the foregoing unsaturated polyesters are also well known and are described in full detail in the patents previously referred to. Copending application Serial No. 818,246, filed June 5, 1959, contains a particularly extensive disclosure of such monomers, and such disclosure is therefore incorporated herein by reference as showing representative monomers, any and all of which may be mixed with the polyester for use in this invention.

The polyesters described in detail in U.S. Patent 2,938,006, Root, May 24, 1960, may be used in the invention for reaction with fatty acid and magnesium oxide, and the disclosure of that patent is therefore incorporated herein by reference to avoid needless repetition. Briefly, such polyester resin may be described as a polymerizable solid Diels-Alder reaction product of a material selected from the group consisting of rosin and abietic acid with a fumarate polyester of a glycol and fumaric acid, in which resin the proportion of said material ranges from about 30 to about 230 grams for each gram-mole of the fumaric acid constituent of the fumarate polyester, and the said reaction product containing double bonds attributable to unreacted fumarate groups.

It is desired to emphasize that the invention is quite distinct from the composition disclosed by Fisk, in U.S. Patent 2,628,209, wherein magnesium oxide is used to thicken the alkyd resin itself, without any addition of fatty acid as in the present invention. The method of Fisk does not serve the purposes and objects of the present invention.

The following examples, in which all parts and percentages are expressed by weight, will serve to illustrate the practice of the invention in more detail.

EXAMPLE I

An alkyd having an acid value of 40 was prepared from 1 mole of maleic anhydride, 1 mole of phthalic anhydride and 2 moles of propylene glycol. About 660 parts of this alkyd was mixed with 330 parts of styrene and 200 parts per million of para-benzoquinone inhibitor to make a polyester composition referred to in Table 1, below, as polyester "A." To 1000 parts of polyester "A" there was added an additional 380 parts of styrene, and other ingredients as shown in the table:

Table 1

| Ingredients | Parts | |
|---|---|---|
| | Mix #I-1 | Mix #I-2 |
| Polyester "A" | 1,000 | 1,000 |
| Additional styrene | 380 | 380 |
| Magnesium oxide | 20.5 | 10.5 |
| Oleic acid | 98 | |
| Calcium chloride | 10 | 10 |

The foregoing mixtures were heated at 200° F. for 30 minutes and then strained to remove the calcium chloride.

Each of the resulting reaction products was compounded in accordance with the following formulation:

| | Parts |
|---|---|
| Calcium carbonate filler | 100 |
| Resinous reaction product | 400 |
| Benzoyl peroxide | 4 |
| Tertiary butyl perbenzoate | 2 |
| Styrene | 4 |
| Quinone | [1] 200 |

[1] P.p.m. (parts per million of resinous reaction product).

Glass fiber preforms (205 grams glass, 510 grams resin composition) were laminated in a matched die mold with each of the foregoing compositions, by heating at 240° F. for a period of 5 minutes. The cured laminates had the physical properties shown in the following Table 2:

Table 2

| Physical properties | Laminate made with reaction product of Mix #I-1 | Laminate made with reaction product of Mix #I-2 |
|---|---|---|
| Tensile strength, p.s.i. | 13,310 | |
| Flexural modulus×10⁶, p.s.i. | 1.2 | |
| Impact strength (notched Izod), ft. lb. | 13.7 | 10.7 |
| Flexural strength, p.s.i. | 28,170 | 22,340 |
| Surface smoothness | Good | Fair |
| Cured surface lustre | Good | Low |
| Resin crazing | No | Yes |
| Hardness (Barcol 934-1) | 28–30 | 53 |

In order to verify the fact that the oleic acid was chemically combined with the polyester, the cured reaction product of mix #I-1 was extracted with petroleum ether. The extract, titrated with potassium hydroxide, calculated as 0.35% extractable oleic acid residue. This is considerably lower than the 6.7% put into the charge and indicated 94% reaction of the oleic acid.

In order to further substantiate the fact that reaction occurs between the fatty acid, the magnesium oxide, and the polyester resin, magnesium dioleate was prepared by heating 40.32 grams of magnesium oxide with 565 grams of oleic acid in 600 grams of styrene for 30 minutes at 200° F. This became a non-homogeneous mixture, which on standing 24 hours striated. This product was blended with polyester resin "A" prepared as described above in accordance with the formulation I-4 in the following Table 3:

Table 3

| Ingredients | Mix #I-3 | Mix #I-4 |
|---|---|---|
| Polyester resin "A" | 100 | 100 |
| Magnesium oleate preparation in styrene | | 20 |
| Methyl ethyl ketone peroxide | 1.0 | 1.2 |

In a casting made from Mix #I-4, cured for 90 minutes at 110° C., a soft film of magnesium dioleate rose to the surface of the resin, and produced a soft tacky condition in the cured product. In contrast, a casting similarly made from Mix #I-3 was hard and non-tacky. Data on the respective cured products are as shown in the following Table 4:

Table 4

| | Cured Casting From Mix #I-3 | Cured Casting From Mix #I-4 |
|---|---|---|
| Gel time at 80° F., min. | 11 | 27 |
| Hardness after one hour (Barcol 935) | 60 | 0 |
| Clarity of casting | High | Low |
| Surface softness of cured castings | None | Much |

Furthermore, the viscosity of the uncured Mix #I-4 was only 5 poises, whereas the viscosity of Mix #I-1 of the invention, even with the high styrene level, was 35 poises. Furthermore Mix #I-1 of the invention, cured with 1% benzoyl peroxide and 0.3% diethyl aniline, did not develop the surface softness or phase separation experienced with Mix #I-4. This indicates that the oleic acid had become reacted with the polyester resin through the magnesium bridge, in the Mix #I-1 of the invention.

EXAMPLE II

A resin-modified polyester was prepared by heating at about 390–460° F. for 4 hours the following mixture, to produce an alkyd having an acid number of 90:

| | Parts |
|---|---|
| Diethylene glycol | 1,410 |
| Fumaric acid | 1,160 |
| Wood rosin | 1,510 |

The alkyd was inhibited with 140 p.p.m. of para-benzoquinone, and 1860 parts of styrene was added. This mixture is identified as polyester "B" in Table 5, below.

Magnesium oxide and oleic acid or stearic acid, and additional styrene in amounts shown in Table 5 below, were added to the polyester-styrene mixture along with calcium chloride, and heated at a temperaure of 200° F. for 30 minutes. Still more styrene was added to the resulting modified resin compositions to bring the final total styrene content to the amount shown, and 1% benzoyl peroxide was added, after which castings were cured 90 minutes at 110° C., and the physical properties were determined to be as shown in Table 5.

Table 5

|  | Mix II-1 | Mix II-2 | Mix II-3 | Mix II-4 |
|---|---|---|---|---|
| Polyester "B" | 1,000 | 1,000 | 1,000 | 1,000 |
| Additional styrene | 432 | 340 | 642 | |
| Magnesium oxide | 20.5 | 41 | 20.5 | |
| Oleic acid | 98 | 196 | | |
| Stearic acid | | | 98 | |
| Calcium chloride | 20 | 20 | 20 | |
| Viscosity, poises | 1,000 | Solid | 300 | 7 |
| Final adjusted total styrene content, percent | 62 | 48 | 66 | 40 |
| Tensile strength, p.s.i. | 6,070 | | 3,510 | 6,740 |
| Elongation-at-break, percent | 1.6 | | 0.80 | 1.4 |
| Flexural modulus×10⁶, p.s.i. | 0.45 | | 0.45 | 0.58 |
| Flexural strength, p.s.i. | 9,970 | | 9,970 | 1,300 |
| Heat distortion temperature, °F | 171 | | 186 | 181 |
| Water absorption in one hour, percent | 0.19 | | 0.17 | 0.21 |
| Rockwell hardness, L scale | 105 | | 103 | 112 |
| Rockwell hardness, M scale | 82 | | 86 | 96 |

The foregoing test results indicate that oleic acid is preferable to stearic acid as the agent for modifying the alkyd resin in the presence of magnesium oxide. Oleic acid modified resin showed no marked deterioration of tensile strength or elongation of the cured casting. The plasticizing effect is exhibited by reduced flexural modulus and strength, heat distortion and hardness.

EXAMPLE III

Polyester resin "A," prepared as described in Example I above, was diluted with additional styrene and treated with magnesium oxide and fatty acids, in amounts shown in Table 6, below, by heating for 30 minutes at 200° F. After the treatment, further styrene was then added to bring the total styrene content to the percentage shown. Benzoyl peroxide was added in amount of 1.5%, and sample castings were cured 90 minutes at 110° C. The results are summarized in Table 6:

Table 6

|  | Mix III-1 | Mix III-2 | Mix III-3 | Mix III-4 | Mix III-5 |
|---|---|---|---|---|---|
| Polyester "A" | 1,000 | 1,000 | 1,000 | 1,000 | 1,000 |
| Additional styrene | 380 | 380 | 380 | 380 | 380 |
| Palmitic acid (C₁₆) | 89 | | | | |
| Myristic acid (C₁₄) | | | 79 | | |
| Oleic acid (C₁₈) | | 98 | | | |
| Tall oil acid | | | | | 98 |
| Magnesium oxide | 20.5 | 20.5 | 20.5 | 20.5 | 20.5 |
| Calcium chloride | 10 | 10 | 10 | 10 | 10 |
| Viscosity, poises | 57 | 53 | 27 | 2 | 135 |
| Resin clarity | Low | Low | Low | Hazy | Hazy |
| Total styrene, percent | 48 | 47.6 | 48.2 | 51.3 | 48 |
| Tensile strength, p.s.i. | 4,850 | 6,270 | 6,230 | 5,520 | 6,300 |
| Elongation, percent | 1.10 | 1.60 | 1.40 | 1.20 | 2.3 |
| Flexural strength, p.s.i. | 11,310 | 11,530 | 11,460 | 9,010 | 10,530 |
| Flexural modulus×10⁶, p.s.i. | 0.47 | 0.46 | 0.55 | 0.47 | 0.54 |
| Water absorption, percent | 0.31 | 0.36 | 0.29 | 0.21 | |
| Bleed out (greasy surface) | None | None | None | None | None |

Glass reinforced laminates were made up, jelled at room temperature (78° F.) and post-cured one hour at 240° F. The laminates consisted of 1½ ounces of chopped strand mat and 2.75 ounces of rovecloth per square foot. This was done to determine the ultimate hardness and efficiency of resin plasicization by the fatty acids. Results obtained are shown in Table 7, below:

Table 7

| Mix No. | Hardness (Barcol 934-1) | Plasticizing Efficiency Rating |
|---|---|---|
| III-1 | 28 | 2-Palmitic acid. |
| III-2 | 28 | 1-Oleic acid (best). |
| III-3 | 40 | 4-Myristic acid. |
| III-4 | 51 | 5-None (poorest). |
| III-5 | 30 | 3-Tall oil acid. |

EXAMPLE IV

A series of resin mixes were prepared as shown in Table 7 below again using polyester "A," prepared as described in Example I above. In each case, the mixture of polyester, tall oil acid, magnesium oxide, calcium chloride and styrene was heated 30 minutes at 200° F. and strained to remove the calcium chloride. The resin mixes were then all adjusted to 51% total styrene content, catalyzed with 2% benzoyl peroxide and 0.4% diethyl aniline. The air curing characteristics were determined as shown in Table 8.

Table 8

|  | IV-1 | IV-2 | IV-3 | IV-4 | IV-5 | IV-6 |
|---|---|---|---|---|---|---|
| Polyester "A" | 1000 | 1000 | 1000 | 1000 | 1000 | 1000 |
| Additional styrene | 380 | 380 | 380 | 380 | 380 | |
| Tall oil acid | 89 | 67 | 45 | 22.5 | 45 | |
| Magnesium oxide | 20.5 | 18 | 15.4 | 12.75 | 20.5 | |
| Calcium chloride | 10 | 10 | 10 | 10 | 10 | |
| (Properties of treated mix after straining:) | | | | | | |
| Viscosity, poises | 65 | 22 | 16.6 | 32 | 51 | 10 |
| Styrene content, percent | 48 | 48.7 | 49.2 | 42.7 | 49.3 | 33 |
| Gel time at 70° F., mins | 13 | 15 | 7 | 10 | 11 | 15 |
| Hardness (Barcol 935) after 3 hours | | 1 | 27 | 31 | 33 | 28 |
| Hardness after 24 hours | 2 | 17 | 33 | 42 | 42 | 42 |
| Hardness after 1 hour at 240° F. | 3 | 34 | 39 | 43 | 41 | 45 |

Having thus described my invention, what I claim and desire to protect by Letters Patent is:

1. A method of making a modified polyester resin composition comprising providing (A) a polyester of a glycol with an alpha, beta-ethylenically unsaturated dicarboxylic acid having an acid value of 10 to 100, mixing the said polyester with (B) a copolymerizable ethylenically unsaturated monomer, (C) a metal compound selected from the group consisting of oxides, hydroxides and alkoxides in which the alkyl group contains 1 to 6 carbon atoms, of magnesium, aluminum and calcium, and (D) an aliphatic monocarboxylic acid having from 6 to 24 carbon atoms, and heating the resulting mixture in the presence of a polymerization inhibitor at a temperature of from 140 to 250° F. for a period of from 5 minutes to 40 hours, whereby the said monocarboxylic acid becomes linked to the said polyester through a metal linkage, to produce a placticized resin composition characterized by increased viscosity, the amount of said monomer (B) being from 5 to 80% by weight based on the entire weight of the composition, the amount of said metal compound (C) being from 0.1 to 3 parts by weight per 100 parts by weight of unmodified polyester (A), and the amount of said monocarboxylic acid (D) being from 1 to 15 parts by weight per 100 parts by weight of unmodified polyester (A).

2. A method as in claim 1 in which the said metal compound is magnesium oxide.

3. A method as in claim 1 in which the heating is carried out in the presence of 1 to 10 parts by weight of calcium chloride per 100 parts by weight of unmodified polyester (A).

4. A method as in claim 3 in which the said metal compound is magnesium oxide.

5. A method as in claim 1 in which the said monocarboxylic acid is oleic acid.

6. A method as in claim 1 in which the said monocarboxylic acid is tall oil acid.

7. A method as in claim 1 in which the said polyester is a polymerizable solid Diels-Alder reaction product of an abietic acid-containing material selected from the group consisting of impure abietic acid in the form of rosin and purified abietic acid itself with a fumarate polyester of a glycol and fumaric acid, in which reaction product the proportion of said material ranges from about 30 to about 230 grams for each gram-mole of the fumaric acid constituent of the fumarate polyester, and the said reaction product containing double bonds attributable to unreacted fumarate groups.

8. A method as in claim 1 in which the said monomer is styrene.

9. A method as in claim 4 in which the said monomer is styrene.

10. A method as in claim 9 in which the said monocarboxylic acid is oleic acid.

11. A method as in claim 9 in which the said monocarboxylic acid is tall oil acid.

12. A modified polyester resin composition which is a reaction product of a mixture of (A) a polyester of a glycol with an alpha, beta-ethylenically unsaturated dicarboxylic acid having an acid value of 10 to 100, (B) a copolymerizable ethylenically unsaturated monomer (C) a metal compound selected from the group consisting of oxides, hydroxides and alkoxides in which the alkyl group contains 1 to 6 carbon atoms, of magnesium, aluminum and calcium, and (D) an aliphatic monocarboxylic acid having from 6 to 24 carbon atoms, said mixture being heated in the presence of a polymerization inhibitor at a temperature of from 140 to 250° F. for a period of from 5 minutes to 40 hours, whereby the said monocarboxylic acid becomes linked to the said polyester through a metal linkage, to produce a plasticized resin characterized by increased viscosity, the amount of said monomer (B) being from 5 to 80% by weight based on the entire weight of the composition, the amount of said metal compound (C) being from 0.1 to 3 parts by weight per 100 parts by weight of unmodified polyester (A), and the amount of said monocarboxylic acid (D) being from 1 to 15 parts by weight per 100 parts by weight of unmodified polyester (A).

13. A composition as in claim 12 in which the said metal compound is magnesium oxide.

14. A composition as in claim 12 in which the heating is carried out in the presence of 1 to 10 parts by weight of calcium chloride per 100 parts by weight of unmodified polyester (A).

15. A composition as in claim 14 in which the said metal compound is magnesium oxide.

16. A composition as in claim 12 in which the said monocarboxylic acid is oleic acid.

17. A composition as in claim 14 in which the said monocarboxylic acid is tall oil acid.

18. A composition as in claim 14 in which the said polyester is a polymerizable solid Diels-Alder reaction product of an abietic acid-containing material selected from the group consisting of impure abietic acid in the form of rosin and purified abietic acid itself with a fumarate polyester of a glycol and fumaric acid, in which Diels-Alder reaction product the proportion of said material ranges from about 30 to about 230 grams for each gram-mole of the fumaric acid constituent of the fumarate polyester, and the said Diels-Alder reaction product containing double bonds attributable to unreacted fumarate groups.

19. A composition as in claim 14 in which the said monomer is styrene.

References Cited by the Examiner

UNITED STATES PATENTS

| | | | |
|---|---|---|---|
| 2,255,313 | 9/1941 | Ellis | 260—42 |
| 2,628,209 | 2/1953 | Fisk | 260—40 |
| 2,904,526 | 9/1959 | Uelzmann | 260—23 |
| 2,922,769 | 1/1960 | Cody | 260—26 XR |
| 2,938,006 | 5/1960 | Root | 260—26 |
| 2,962,455 | 11/1960 | Hostettler et al. | 260—78.3 |
| 2,979,497 | 4/1961 | Rinse | 260—414 XR |
| 3,110,690 | 11/1963 | Friedsam | 260—26 XR |

DONALD E. CZAJA, *Primary Examiner.*

MILTON STERMAN, LEON J. BERCOVITZ,
*Examiners.*